E. D. SELF.
AUTOMOBILE.
APPLICATION FILED JUNE 9, 1915.
1,203,796.
Patented Nov. 7, 1916.
2 SHEETS—SHEET 2.
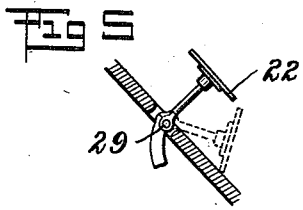
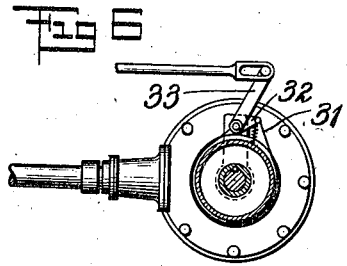
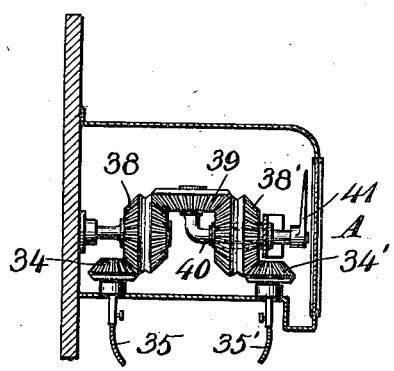
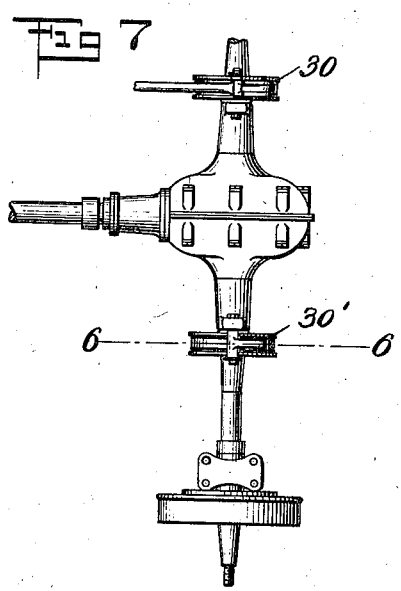
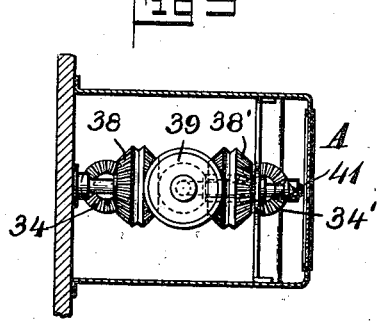
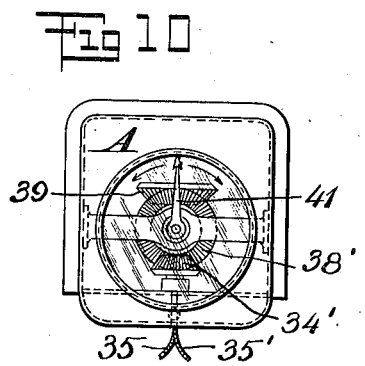
Inventor
Edward D. Self
By his Attorneys

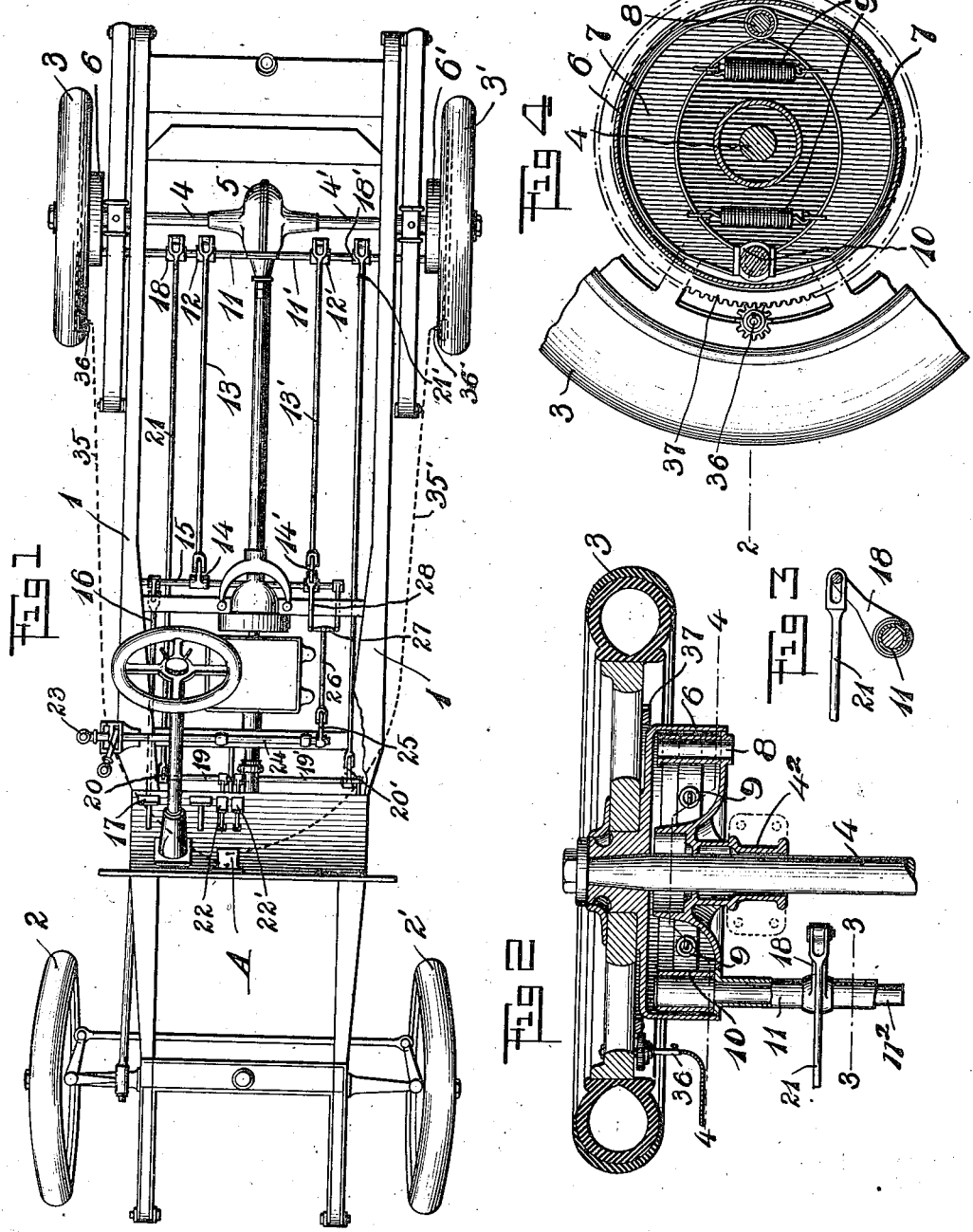

UNITED STATES PATENT OFFICE.

EDWARD D. SELF, OF FLORENCE, ITALY.

AUTOMOBILE.

1,203,796.  Specification of Letters Patent.  Patented Nov. 7, 1916.

Application filed June 9, 1915. Serial No. 33,155.

*To all whom it may concern:*

Be it known that I, EDWARD DANFORTH SELF, a citizen of the United States, residing at Florence, Italy, have invented a certain new and useful Improvement in Automobiles, of which the following is a full, clear, and exact description.

My invention relates to improvements in automobiles and has for its object to provide means controllable by the operator for checking the rotation of one of the driving wheels through the differential gearing when the other driving wheel is held stationary.

In the present construction of automobiles the driving axle is furnished with a system of gearing called the differential.

When on account of the condition of the street or for other reasons, one of the driving wheels of an automobile is found on account of mud or other reason no longer held by the contact with the street, it begins to revolve too rapidly while the other driving wheel will revolve at a less velocity on account of the contact with the street and the normal action of the differential; and in consequence the wheel that has the least attrition assumes, on account of the said differential, a great useless velocity while the other that is on firmer ground remains almost immovable and the vehicle can not advance.

The invention that forms the object of the present application for patent has the object of remedying the above mentioned difficulty by retarding the excessive velocity of either wheel in such a way that the velocity assumed by the wheel that has the less contact is assumed to a certain point by the other wheel that is in a better condition to operate usefully. In other words, by means of a brake, the wheel or part of the differential to which it corresponds that revolves with too great a velocity on account of the lack of resistance has now a resistance equal or even greater than that of the other wheel, which is thus compelled to turn on account of the differential. This purpose is accomplished in the following manner: to the two brakes that are usually applied to the two driving wheels that act together with the same pressure on the right and left hand wheel and have a single control by hand or pedal, are added two other similar systems of levers to those of the brakes already in use, each with independent control.

The two systems of (new) brakes can be the same as those already in use and their control can be located on the same shafts that carry the brakes actually used or they can be applied directly to any part of the axles of the differential connected with each one of the two wheels, or there can be used for the object I am describing, two other brakes absolutely independent of those actually in use, the indispensable condition being that each one of the two brakes should operate independently of the other. Therefore, in case that one of the wheels, for example the one on the right, has insufficient adherence to the street and revolves very rapidly, the left hand wheel, if well supported on the ground and subject to resistance, revolves with a much less velocity or perhaps remains stopped because the action of the differential permits that there may be a great difference of velocity between one wheel and the other.

Operating on the right hand wheel one of the brakes of the new system of independent brakes that is the object of the present application for patent, the said right hand wheel will immediately decrease its velocity and the velocity of the left hand wheel will be increased on account of the usual and well known operation of the differential.

So that the operator can easily know that one of the wheels is in an abnormal condition in respect to its velocity, that is, revolves with too great rapidity, and thus apply the new independent brake to one of the proper wheels rather than the other, it is convenient and important that the system of braking above indicated be furnished with an indicator that shows which of the two wheels revolves with the greater velocity. This indicator, that forms a part of the invention and which will be described below, is composed of a pointer that turns to the right or left when one or other of the wheels revolves with greater velocity. The movement of this pointer is obtained by a system of three conical gear wheels, that of the center attached to the pointer having two movements, one normal in respect to the external gears, and of rotation together with the shaft that carries the pointer; the said movement of the gear and bent shaft occurs when the external wheels do not revolve with the same velocity. The external gears are operated by means of two series of gearing and flexible shafts, each dependent upon the corresponding driving wheel of the automobile. One of the best methods of application is that for example here described and illustrated by drawings.

It is to be noted that the control of the independent brakes may be obtained by pedals and hand levers.

The following is a description of an embodiment of my invention, reference being had to the accompanying drawings, in which, Figure 1 shows a plan view of the chassis of an automobile; Fig. 2 is a section on the line 2—2, Fig. 4; Fig. 3 is a detail showing the connection between the brake cranks and their connecting rod; Fig. 4 is a section on the line 4—4, Fig. 2; Fig. 5 is a detail of a foot pedal; Fig. 6 is a section on the line 6—6, Fig. 7, showing a modified form of brake; Fig. 7 is a plan view of the brake and shaft shown in Fig. 6; Fig. 8 is a plan view of an indicating mechanism for indicating which one of the driving wheels is moving at the faster rate; Fig. 9 is a side elevation of the same; and, Fig. 10 is a front elevation of the same.

Referring more particularly to the drawings, 1—1 is the ordinary frame of an automobile, supported by the wheels 2—2' and 3—3', the latter being mounted respectively upon the shafts 4—4' in bearings $4^2$ and connected through the ordinary differential 5. The brake wheels are each provided with brake drums 6, within which are brake shoes 7 pivotally connected at 8 and normally drawn toward each other by springs 9.

10 is a cam which lies between the free ends of each pair of brake shoes, which, when turned, forces the brake shoes apart against the action of the spring 9 and into engagement with the interior of the drum 6, producing a braking action. This particular form of drum, brake shoe and cam forms no part of my present invention, the invention consisting in means for operating the two cams and hence the two pairs of brake shoes simultaneously or independently as the operator may desire.

11—11' are two properly mounted sleeves, containing independently movable shafts $11^2$, each of which carries on its outer end a cam 10 for operating the corresponding pair of brake shoes. These shafts are provided with two crank arms 12—12' to which are connected tie rods 13—13' in the manner shown in Fig. 3, the tie rod being slotted so as to provide lost motion. These tie rods are in turn connected to crank arms 14—14' which are mounted upon the suitably supported shaft 15. To this shaft 15 is connected a link 16, which is connected to a foot pedal 17. When the foot pedal 17 is actuated, the two shafts $11^2$ within the sleeves 11—11' will be simultaneously turned so as to actuate their cams and simultaneously apply the brakes on both of the driving wheels.

In order to apply the brake on one driving wheel independently of that upon the other driving wheel, I mount the crank arms 18—18' upon the shafts 11 and 11' respectively and provide two independent shafts 19—19' at the forward end of the machine. These crank shafts 19—19' are provided with crank arms 20—20' respectively. The crank arms 18 and 20 are connected together by a tie rod 21 and the crank arms 18' and 20' are connected together by a tie rod 21', the connections between the two tie rods last mentioned and their respective cranks 18 and 18' being also a lost motion connection as shown in Fig. 3. To the shafts 19 and 19' are connected levers, which terminate in foot pedals 22—22'. By actuating the pedal 22 the wheel 3 can be braked by its cam 10 independently of wheel 3' and by actuating the pedal 22' the wheel 3' can be braked independently of the wheel 3.

By means particularly described above, the wheels 3—3' can be braked simultaneously through the lever 17 or can be braked independently by either of the levers 22—22'. The slotted connection between the tie rod and crank arm as shown in Fig. 3 permits either set of braking levers to be operated without affecting the other set.

23 is the handle for controlling the brakes by hand, which is connected to a shaft 24, on which is mounted a crank arm 25, which is connected to a tie rod 26. This tie rod is connected to a lever 27, one end of which is pivoted to a fixed member, while the other end is connected to a link 28, which in turn is connected to the crank arm 14'. By operating this brake lever 23, the cams 10 can be simultaneously actuated so as to brake both the driving wheels 3 and 3' when desired.

The control pedals 22 and 22' of the independent brakes are hinged at 29 as indicated in Fig. 5. The object of this hinge is to prevent the operator from confusing the independent pedals with the usual brake pedals. To make use of the independent brake, it is sufficient to raise the pedal with the foot until it becomes rigid, whereupon it can be used to operate the brake to which it is connected.

The system of independent brakes beside being applied to drums upon the respective wheels, can also be applied to other parts of the driving shaft, as indicated in Figs. 6 and 7. In Figs. 6 and 7 brake drums 30—30' are shown connected to the respective driving shafts on each side of the differential. Each of these drums is surrounded by a strap 31, one end of which is secured to the lever 32 to which a link such as the links 21—21' is connected so as to be actuated by the two independent pedals respectively, said independent brakes being thus supplemental to the brakes used for simultaneously braking.

The indicator A for showing the driver which wheel is stationary or moving more slowly than the other is shown in Figs. 8, 9 and 10. In this indicator there are two revoluble bevel gears 34—34' which are actuated through flexible shafts 35—35', which are driven by gears 36—36' engaging gears 37 on the driving wheels. The gears 34 and 34' drive double bevel gears 38—38'. A bevel gear 39, mounted so as to have its axis at right angles to the axis on which the gears 38—38' are mounted, engages with the inner faces of these double bevel gears. This gear 39 is free to revolve on its own axis and is carried by a shaft 40 whose axis coincides with the axis of the gears 38—38' and is free to revolve. This shaft carries a pointer 41. With this indicator, when the driving wheels are running at the same speed, the gears 38 and 38' are driven in opposite directions at the same speed with one another, with the result that the gear 39 rotates upon its axis but does not cause the shaft 40 to turn. If, however, one of the driving wheels is held stationary while the other driving wheel is rotated in a forward direction, the shaft 40 will be rotated so as to move the indicating pointer 41 in one direction. If, however, the other driving wheel is held stationary and the driving wheel first mentioned is rotated in a forward direction, the shaft 40 will be actuated so as to move the pointer 41 in the opposite direction. This clearly indicates to the driver which of the driving wheels is stationary and which is moving. It also indicates which one is moving at the faster rate. The brakes control the indicator through the wheels so that the indicator shows the effect produced by either brake when independently actuated.

As will be evident to those skilled in the art, my invention permits of various modifications without departing from the spirit thereof or the scope of the appended claims.

What I claim is:

1. In an automobile, the combination of two rear wheels, differential gearing therefor, brakes for said wheels, forwardly extending means for independently actuating said brakes, an indicator visible to the operator of said automobile when applying said brakes, actuating means connecting said wheels to said indicator, said indicator being controlled by said brake actuating means through said wheels, brakes and connections.

2. In an automobile, the combination of two rear wheels, a brake for each of said wheels, respectively, two independently movable rear lever-members for actuating said brakes, tie-rods connected to said lever-members, forward lever-members to which said tie-rods are connected, means for actuating said forward lever-members independently of each other, a lever-carrying countershaft, tie-rods connecting said countershaft to each of said rear lever-members, means for actuating said countershaft so as to apply both of said brakes simultaneously through said rear lever-members, one at least of the ends of each of said countershaft tie-rods having a lost motion connection.

3. In an automobile, the combination of two rear wheels, a brake for each of said wheels respectively, two independently movable rear lever-members for actuating said brakes, tie-rods connected to said lever-members, forward lever-members to which said tie-rods are connected, means for actuating said forward lever-members independently of each other, a lever-carrying countershaft, tie-rods connecting said countershaft to each of said rear lever-members, means for actuating said countershaft so as to apply both of said brakes simultaneously through said rear lever-members, one at least of the ends of each of said tie-rods having a lost motion connection.

EDWARD D. SELF.